(12) United States Patent
Eleto Da Silva et al.

(10) Patent No.: US 9,085,487 B2
(45) Date of Patent: Jul. 21, 2015

(54) LARGE SCALE PRODUCTION OF CARBON NANOTUBES IN PORTLAND CEMENT

(75) Inventors: Edelma Eleto Da Silva, Belo Horizonte (BR); Luiz Orlando Ladeira, Belo Horizonte (BR); Rodrigo Gribel Lacerda, Belo Horizonte (BR); Sérgio De Oliveira, Sao Joao Batista (BR); André Santarosa Ferlauto, Belo Horizonte (BR); Eudes Lorençon, Belo Horizonte (BR); Erick De Sousa Ávila, Ribeirão das Neves (BR)

(73) Assignee: UNIVERSIDADE FEDERAL DE MINAS GERAIS, Belo Horizonte (BR)

( * ) Notice: Subject to any disclaimer, the term of this patent is extended or adjusted under 35 U.S.C. 154(b) by 531 days.

(21) Appl. No.: 12/990,644

(22) PCT Filed: Apr. 30, 2009

(86) PCT No.: PCT/BR2009/000119
§ 371 (c)(1),
(2), (4) Date: Jan. 11, 2011

(87) PCT Pub. No.: WO2009/132407
PCT Pub. Date: Nov. 5, 2009

(65) Prior Publication Data
US 2011/0107942 A1 May 12, 2011

(30) Foreign Application Priority Data
Apr. 30, 2008 (BR) ..................................... 0802018

(51) Int. Cl.
*C04B 7/48* (2006.01)
*C23C 16/26* (2006.01)
(Continued)

(52) U.S. Cl.
CPC ............. *C04B 14/026* (2013.01); *B01J 23/745* (2013.01); *B01J 23/78* (2013.01); *B01J 37/0203* (2013.01);
(Continued)

(58) Field of Classification Search
CPC .................................. C04B 7/48; C23C 16/26

USPC ......................................... 427/447.3; 106/739
See application file for complete search history.

(56) References Cited

U.S. PATENT DOCUMENTS 7,666,327 B1 * 2/2010 Veedu ............................ 252/510
7,875,211 B1 * 1/2011 Veedu ............................ 252/506
(Continued)

FOREIGN PATENT DOCUMENTS

JP          3174341       7/1991
JP       2002-263496      9/2002
(Continued)

OTHER PUBLICATIONS

International Search Report for PCT/BR2009/000119, four pages, dated Apr. 15, 2011.
(Continued)

*Primary Examiner* — Paul Marcanton
(74) *Attorney, Agent, or Firm* — Nixon & Vanderhye PC

(57) ABSTRACT

The present invention describes a chemical vapor-phase deposition for carbon nanotube synthesis in which cement clinker is used as a ceramic matrix for anchoring transition-metal nanoparticles. Using cement clinker as nanoparticle anchoring base of transition metals allows carbon nanotubes to be generated on cement clinker particles and grains, in this way producing a kind of cement that is nanostructured with carbon nanotubes. By this process, the carbon nanotube synthesis and integration to clinker are carried out in just one continuous and large-scale stage. The process described herein can be applied to conventional cement industry whose production may be rated as tons per day. The present invention also proposes—as part of the carbon nanotube synthesis on cement clinker—several enrichment alternatives of cement clinker by using transition metals for producing such nanostructured composite, which may or not be integrated to the conventional cement industry.

20 Claims, 10 Drawing Sheets

(51) Int. Cl.
  *C04B 14/02* (2006.01)
  *B01J 23/745* (2006.01)
  *B01J 23/78* (2006.01)
  *B01J 37/02* (2006.01)
  *B82Y 30/00* (2011.01)
  *B82Y 40/00* (2011.01)
  *C01B 31/02* (2006.01)
  *C04B 7/42* (2006.01)
  *B01J 21/10* (2006.01)
  *B01J 23/881* (2006.01)

(52) U.S. Cl.
  CPC .............. *B82Y 30/00* (2013.01); *B82Y 40/00* (2013.01); *C01B 31/024* (2013.01); *C01B 31/0233* (2013.01); *C04B 7/421* (2013.01); *B01J 21/10* (2013.01); *B01J 23/881* (2013.01)

(56) References Cited

U.S. PATENT DOCUMENTS

2004/0025753 A1  2/2004  Brunner et al.
2007/0160522 A1  7/2007  Ryu et al.

FOREIGN PATENT DOCUMENTS

| | | |
|---|---|---|
| JP | 2004-026626 | 1/2004 |
| KR | 2001-0088087 | 9/2001 |
| WO | 2004/087565 | 10/2004 |

OTHER PUBLICATIONS

Written Opinion for PCT/BR2009/000119, four pages, dated Apr. 15, 2011.
International Preliminary Report on Patentability for PCT/BR2009/000119, five pages, dated May 3, 2011.

* cited by examiner

LARGE SCALE PRODUCTION OF CARBON NANOTUBES IN PORTLAND CEMENT

This application is the U.S. national phase under 35 U.S.C. 371 of International Application No. PCT/BR2009/000119 filed 30 Apr. 2009, which designated the U.S. and claims priority to Brazilian Application No. PI0802018-3 filed 30 Apr. 2008; the entire contents of each of which are hereby incorporated by reference.

The present invention describes a chemical vapor-phase deposition for carbon nanotube synthesis in which cement clinker is used as a ceramic matrix for anchoring transition-metal nanoparticles. Using cement clinker as nanoparticle anchoring base of transition metals allows carbon nanotubes to be generated on cement clinker particles and grains, in this way producing a kind of cement that is nanostructured with carbon nanotubes. By this process, the carbon nanotube synthesis and integration to clinker are carried out in just one continuous and large-scale stage. The process described herein can be applied to conventional cement industry whose production may be rated as tons per day. The present invention also proposes—as part of the carbon nanotube synthesis on cement clinker—several enrichment alternatives of cement clinker by using transition metals for producing such nanostructured composite, which may or not be integrated to the conventional cement industry.

STATE OF THE ART

Nowadays, carbon nanotubes are recognized as one of the most important materials in nanoscience and nanotechnology with ample and varied use in material and biomaterial engineering, chemistry and petrochemistry, pharmaceutics and medicine. Particularly, incorporating carbon nanotubes into polymeric matrices is now a source of new polymeric composites comprising much superior mechanical properties as compared to those of conventional polymers.

Carbon nanotubes are tube-shaped carbon fiber nanostructures whose diameters range from 0.7 to 50 nm and with 0.5 to 100 μm in length. Nanotube carbon atoms are linked to each other by a strong covalent bond forming a flat, hexagonal network, which is typical of the graffiti phase of carbon. Carbon nanotubes are formed by rolling up carbon sheets, which may be made of a single carbon sheet or of multiple rolled-up concentric sheets, called single-walled carbon nanotubes (SWNTs) and multi-walled carbon nanotubes (MWNTs), respectively. Such strong linkage between carbon atoms gives exceptional physico-chemical properties to these materials, such as: high mechanical resistance, chemical inertia and great specific surface.

The carbon nanotube elasticity module lies in the range of 1 to 1.8 TPa that is well above that of 800 GPa, which is typical of commercial carbon fibers (Treacy M, Ebbesen T W, Gibson J M. 1996. *Nature* 381:678-80) and its rupture strength comes up to 50 times higher than that of steel. Such carbon nanotube mechanical properties improve the mechanical and structural features of materials containing them in their composition.

The literature listed below deals with carbon nanotubes' potential and their varied applications: M. S. Dresselhaus, G. Dresselhaus, P. C. Ecklund, Science of Fullerenes and Carbon Nanotubes, Academic Press, San Diego (1996); Peter J. F. Harris, Carbon Nanotubes and Related Structures: New Materials for the Twenty-first Century, Cambridge University Press, 2008-ISBN-13: 9780521005333; Mauricio Terrones, SCIENCE AND TECHNOLOGY OF THE TWENTY-FIRST CENTURY: Synthesis, Properties and Applications of Carbon Nanotubes, Annu. Rev. Mater. Res. 2003. 33:419-501

Among the various large-scale nanotube synthesis routes, the chemical vapor-phase deposition for carbon nanotube synthesis is the most promising one. This process works basically through decomposition or pyrolysis of light hydrocarbons (methane, ethylene, acetylene) as carbon precursor agents. Such decomposition is processed under controlled atmosphere by using mainly inert gases as carrier agent for carbon nanotubes growth and as drag for reaction by-products. The aforesaid synthesis system is basically comprised of a tubular kiln with controlled temperature and flow controllers of gases involved in the process, as is schematically illustrated in FIG. 1. FIG. 1 consists of a schematic drawing of a chemical phase-vapor deposition in the nanotube catalytic synthesis on oxide particles and it offers a microscopy vision of carbon nanotubes' growth by using the aforementioned technique.

Generally speaking, growth processes of carbon nanotubes by chemical phase-vapor deposition occur at the atmospheric pressure and the reaction of the decomposition of carbon gas precursor is catalyzed by nanoparticle transition metals that are anchored in thermally stable metal-oxide support. The catalyzer is designed to promote selectivity in the pyrolysis reaction so that it occurs preferentially on the surface of these nanoparticles.

The classical anchoring supports of transition metal nanoparticles used for higher efficiency carbon nanotube synthesis via chemical phase-vapor deposition are mesoporous structures involving oxides with great thermal stability at high temperatures, as follows: $Al_2O_3$, $SiO_2$, $MgO$ and $CaO$ or a combination of them. Additional information on carbon nanotube synthesis catalyzed by transition metal nanoparticles may be found in: Cassell A., et al. J Phys Chem B; 103: 6484-92; (1999); Zhang Z. J., et al. Appl Phys Lett; 77: 23 3764-3766 (2000); Cui H, Eres G, et al. Chem Phys Lett; 374: 222-8(2003); Kathyayini H., et al. J Mol Catal A; 223: 29-36 (2004); Harutyunyan A. R., et al. Nano Lett; 2: 525-30 (2002); Coquay, P., et al., *Hyperfine Interactions;* 130: 275-299 (2000); Ding F., et al. *J. Phys. Chem.;* 121: 2775, 2004; H. Hafner, et al. *Chem Phys. Lett.;* 296: 195 (1998); Geng J F, et al. *Chem Comm;* 22: 2666-7 (2002); Tang S., et al, *Chem Phys Left;* 350: 19-26 (2001); Liu B. C., et al. *Chem Phys Lett;* 383: 104-8 (2004); Shajahan M. D., et al. *Carbon;* 42: 2245-53 (2004).

Portland cement is agglomerate material resulting from a mixture of calcium silicates, aluminates and ferro-aluminates in fine particles called clinker to which gypsite is added ($CaSO_4$). Cement clinker is obtained by a limestone and clay mixture calcined at high temperatures. Therefore, after calcination, cement clinker basically adds silica, alumina, calcium oxide, as well as other minerals and oxides. The major constituents of Portland cement clinker are: calcium silicates, called $C_3S$ ($3CaO$—$SiO_2$) and $C_2S$ ($2CaO$—$SiO_2$), calcium aluminates, called $C_3A$ ($3CaO$—$Al_2O_3$), calcium ferro-aluminates, called $C_4AF$ ($4CaO$—$Al_2O_3$—$Fe_2O_3$), besides gypsite ($CaSO_4$), which is added after the clinker formation phase so as to inhibit the instantaneous setting provoked by the high reactivity of $C_3A$. The generic composition of Portland cement clinker is as follows: 54% $C_3S$, 16% $C_2S$, 10% $C_3A$ and 10% $C_4AF$. Portland cement hydration is a kinetic process involving partial dissolution and incorporation of water and precipitation in the clinker phases, whose initial hardening is due to the hydration of aluminates and to the resistance evolution (hardening) by the hydration of silicates. The mechanical properties of hydrated cement are a direct result from the presence of water in the crystalline network of clinker phases and their binding by hydrogen bonds.

Several innovations aiming to improving cement quality can be found in the literature related to technological research and development of cement. Research and technological improvements in this area are usually focused on the incorporation of nanostructured additives or surfactants viewing to increase mechanical resistance, change fluidity or alter the cement curing speed. Some state-of-the-art papers describing technologies and scientific work related to nanostructured cements were found.

Balaguru, P. N. and collaborators believe that cement added with objects in a nanometric scale opens up enormous opportunities in the area of ultra-high resistance as well as in the area of electronics. Therefore, Portland cement could become a high-technology material, as compared to its present status of conventional material for construction. "Nano-concrete: possibilities and challenges". Balaguru, P. N.; Chong, Ken; Larsen-Basse, Jorn. Rutgers, The State University of New Jersey, USA. RILEM Proceedings (2005), 2nd International Symposium on Nanotechnology in Construction (NICOM2), 2005, 233-243

Jiang, Xin and collaborators describe the use of carbon nanotubes for cement reinforcement, showing that better results in increased mechanical properties are obtained with optimized dispersion and connection of nanotubes to the concrete matrix. "Carbon nanotubes as a new reinforcement material for modern cement-based binders". Jiang, Xin; Kowald, Torsten L.; Staedler, Thorsten; Trettin, Reinhard H. F. Institute of Materials Engineering, University of Siegen, Germany. RILEM Proceedings (2005), 2nd International Symposium on Nanotechnology in Construction (NICOM2), 2005, 209-213

Li, Geng Ying and collaborators report changes in physical properties of cement due to pressure with addition of functionalized carbon nanotubes. "Pressure-sensitive properties and microstructure of carbon nanotube reinforced cement composites". Li, Geng Ying; Wang, Pei Ming; Zhao, Xiaohua. State Key Laboratory of Concrete Material Research, Tongji University, Shanghai, Peop. Rep. China. Cement & Concrete Composites (2007), 29(5), 377-382.

Middendorf, B, wrote a review showing the advancement of knowledge on cement hydration reactions in nanoscale and the influence of added nanosilica and carbon nanotubes in such reactions. "Nanoscience and nanotechnology in cementitious materials". Middendorf, B. Dept. of Building Materials, University Dortmund, Dortmund, Germany. *Cement International* (2006), 4(4), 80-86.

G. Yakovlev and collaborators demonstrated that adding 0.05% in weight of carbon nanotubes to Portland cement increase its thermal conductivity from 12% to 20% and strengthens its resistance to compression up to 79%. "Cement Based Foam Concrete Reinforced by Carbon Nanotubes". G. Yakovlev, J. Keriene, A. Gailius, I. Girniene, *Materials Science*. (2006), 12, (2).

Some patents and papers describing additives and processes developed for improving and altering cement and related ceramic materials are listed below.

Patent "Blast-resistant concrete also suitable for limiting penetration of ballistic fragments", US27228612A1 describes a concrete that has been improved so as to become more rigid and harder than the traditional one, containing a uniform mixture of Blaine cement, sand, silica, silica powder and microinclusions to which specific amounts of HRWRA and water are added.

US27010517A1, entitled "Nanocomposite polymers", describes the addition of carbon nanotubes or nanoparticles in suspension to polymers.

The patent entitled "Binder composition for rapid-curable ultrahigh-strength concrete from cement blended with silica fume, aluminosulfate clinker and anhydrite", KR 2006-76028 20060811, describes an addition of silica anhydride and nanoparticles to cement clinker so as to produce high-resistance cement.

It is well known that adding nanomaterials to cement leads to improvements in its performance. Particularly, adding carbon nanotubes in the range of 0.05% to 1% to cement induce improvement in its compression module. However, adding carbon nanotubes to cement in concentrations ranging from 0.05% to 1% is unviable and unthinkable as a construction material due to its cost and limited supply. As an example, adding 0.05% of nanotube concentration to cement would lead to a 1,000 times higher price in the international market.

No technology describing the use of cement clinker as transition metal nanoparticle anchoring support for carbon nanotubes growth in situ or processes describing carbon nanotubes synthesis integrated to the conventional cement industry were found.

The present invention describes a direct carbon nanotube/cement clinker synthesis by adding from 0.05% to 1% of carbon nanotubes onto cement clinker, in this way forming a carbon nanotubes/cement clinker composite and the estimated cost of which would only double the final price.

In order to improve carbon nanotubes production, which would make it possible a rapid and industrial-scale process and viewing lower costs, the present invention describes a large-scale production process of carbon nanotubes at reduced costs and also describes a CNP growth process on cement clinker—a material largely used in cement industries—which could be suitable for traditional cement industries.

The said invention additionally describes the production of a nanostructured composite, rich in CNT, which can be used for several industrial applications, including the qualitative improvement of cement itself. The process described in the present invention produces a nanostructured composite of clinker containing CNT and basically involves one or two stages, as follows:

1—A catalytic enrichment and activation method of basic cement clinker containing oxides or transition metal compounds so as to make it possible growing carbon nanotubes based on cement clinker components;

2—A chemical vapor-phase deposition process by means of light hydrocarbon pyrolysis that enables a continuous and large-scale production of this new nanocomposite, by integrating and interconnecting clinker grains and carbon nanotubes.

Therefore, this invention reports a process of a continuous production of carbon nanotubes using basic components of cement clinker as support matrix of transition metal nanoparticles, which promove carbon nanotubes growth.

The aforesaid process also allows integrating carbon nanotubes to the traditional cement which are now recognized as fibrillar materials presenting exceptional mechanical resistance and in this way, improving significantly its physicochemical properties. Furthermore, adding carbon nanotubes to traditional cement modifies its hydration kinetic processes, time of cure and hardening, besides allowing controlled changes in some of its physical properties, such as thermal and electrical conductivity, resistance to aggressive chemical environments, as well as changes in its hydrophobicity.

DETAILED DESCRIPTION OF THE INVENTION

Firstly, in order to develop such technology, basic components of cement clinker proved to be good anchor supports for transition metal nanoparticles, producing carbon nanotubes by chemical vapor-phase deposition with efficiency comparable to the best supports for growing CNT described in the literature. Furthermore, iron content in the basic cement clinker composition contained in the $C_4AF$ phase was proved to be sufficient to catalyze the decomposition reaction of light hydrocarbons and promove carbon nanotubes growth. Based on this finding, developing an industrial process for a large-scale production of such nanostructured cement composite containing carbon nanotubes is possible, which can be integrated to the conventional cement industry after the calcination phase of clay and limestone mixture, i.e., after the cement clinker production phase.

The calcium silicates and aluminates present in the cement clinker are highly stable compounds in high temperatures ranging from 600° C. to 1,400° C., being such temperatures optimal temperatures for the carbon nanotubes synthesis. The transition metals Fe, Co, Ni, or a mixture of them, act as catalysers for the growth of carbon nanotubes in the chemical vapor-phase deposition (CVD) process where the precursor carbon source is gaseous.

The basic cement clinker contains the $C_4AF$ phase ferro-aluminate of calcium, whose iron content is a source of iron nanoparticles that are sufficient for catalyzing the carbon nanotubes synthesis. Changes in clinker chemical composition with a previous enrichment by transition metal oxides, such as $MoO_4$, $CoO$, $NiO$ or $Fe_2O_3$, or chemical compounds containing one or more of such metals in a concentration higher than 0.1% of clinker basic components in some cases improve efficiency of the carbon nanotubes synthesis onto cement clinker components.

The synthesis process of nanostructured cement containing the carbon nanotubes described in the aforesaid invention can be or not applied to the conventional cement industry. Therefore, preparations of cement clinker—i.e., containing or not additional enrichment with transition metals before or after clinker production that may or not be incorporated to the conventional cement industry will be described.

Thus, adding transition metal oxides containing a relative concentration higher than 0.1% to clinker basic components called Catalytic Enrichment and Activation of Basic Portland Cement Clinker—can be made before or after clinker production, as follows:

1—Incorporating transition metals to clinker basic materials before the calcinations phase. Oxides or transition metal compounds are added to clinker precursor materials, such as clay and limestone, before the calcination phase. Therefore, the emergence of metal oxide nanoprecipitates involves two steps: their solubilization in the clinker phases at high temperatures (around 1,400° C.) and; surface segregation of such crystallites in the clinker cooling stage. Thus, cement clinker with or without previous enrichment by transition metal oxides presents an optimal catalytic activity for a large-scale in situ continuous synthesis of carbon nanotubes.

2—The cement clinker enrichment with transition metals after calcination which is carried out by adding chemical compounds containing transition metals as mentioned above after cement clinker production. In this case, clinker enriched with transition metals needs to undergo a previous physical mixture of such clinker compounds in ball mills or a liquid mixture or organic solutions of transition metal compounds and posterior calcination at oxidizing atmosphere before carbon nanotubes synthesis is produced.

Since carbon nanotubes synthesis is catalyzed by transition metal nanoparticles anchored in stable oxide support, then several possible alternatives for cement clinker enrichment with nonlimiting metal nanoparticles can be described. Such synthesis may be used in the cement productive process before or after clinker formation, depending on the synthesis route chosen for this nanocomposite of carbon nanotubes/cement clinker.

Clinker Enrichment Method Using Transition Metals

1—Impregnation by Transition Metal Salts.

Adding transition metals to cement clinker consists in a first process in which transition metal salts and compounds, such as transition metal sulphates, nitrates, oxalates, citrates, phosphates, acetates, as nonlimiting Fe, Ni, Co are dissolved in polar, anhydride and volatile organic solvents, such as nonlimiting isopropanol, ethanol, methanol, methyl ether, tetrahydrofuran and acetone. Therefore, a liquid ionic solution of said salts and compounds is obtained in a water-free environment. This solution is then combined with cement clinker until a homogeneous mixture is obtained and then put into a kiln at temperatures ranging from 60° C. to 200° C. for the solvent volatization. Then, the mixture is calcined in muffle kiln in temperatures ranging from 200° C. to 800° C. for 1 hour. In this way, clinker is impregnated with such transition metal oxides and becomes active for carbon nanotubes synthesis by chemical vapor-phase deposition. The mixture composition of cement clinker and transition metal oxides is controlled by the ionic concentration of transition metals in liquid phase and said solution volume, which is mixed with a certain cement clinker mass.

2—A Method for a Solid Mixture of Transition Metal Oxides or Compounds to Cement Clinker.

The said method consists in incorporating transition metal oxides or compounds or a combination of them, such as nonlimiting iron oxides, cobalt or nickel, when preparing the clay and limestone mixture before calcination at oxidizing atmosphere for cement clinker formation. The mixture proportion is previously determined so as to produce a cement clinker with the desired concentration of microprecipitated phases onto cement clinker enriched with transition metals necessary to catalyze in situ synthesis reaction of carbon nanotubes. The said mixture may be or not performed in a ball mill. As mentioned before, microprecipitates rich in transition metals result from two consecutive processes occurring during clinker formation, as follows: dissolution of transition metal oxides in clinker phases at high temperatures and; segregation when cooling happens.

Another alternative for transition metal clinker enrichment may be carried out by the solid-phase physical mix of cement clinker together with transition metal oxides after clinker calcination. For this, transition metal oxides are incorporated to the already calcined clinker by solid-phase physical mixing using or not a ball mill, whose proportions vary from 0.1% to 10% in the concentration of transition metals. The latter method only differs from that of enrichment of cement clinker by adding liquid-phase transition metals for incorporating transition metal oxides or compounds, when preparing the clay and limestone mixture before calcination at oxidizing atmosphere for cement clinker formation or after its calcination. Choosing whether enrichment of clinker containing transition metals is to be performed before or after calcination during cement clinker formation depends on choosing this nanocomposite productive route. Furthermore, low-cost transition metal precursors can be used as waste of other industrial processes: wastes of rolling scale from steel mills, red mud—a residue of aluminum ore (bauxite) extraction from aluminum industries or iron ore as extracted from iron mines.

3—Preparing Mesoporous Cement Clinker.

This preparation is performed by mixing clinker with anhydride organic polar solution whose solvent can be an anhydride organic polar compound, such as ethanol, methanol, isopropanol, tetrahydrofuran, methyl or ethyl ether in which salts or transition metal compounds are dissolved, such as citrates, oxalates, nitrates, sulphates or phosphates of Ni, Co or Fe. The said clinker and liquid solution mixture is prepared in such a way to determine the desired proportion of clinker and transition metals. In a second phase, urea, citric acid or oxalic acid—preferably urea—are added to the mixture with an anhydride organic polar solvent—preferably but nonrestrictive to ethanol—and this mixture is homogenized by physical mixing or using a ball mill. A third phase is then carried out in which the mixture is put into a muffle kiln for calcination at temperatures from 400° C. to 800° C.—preferably at 600° C.—for some minutes. The said solution starts boiling at such temperatures, ethanol residues evaporate and an oxy-reduction occurs together with the urea thermal decomposition; then the material volume grows by the action of produced gases. When using urea in this process, the specific surface of clinker materials is well increased, showing microprecipitated transition metal oxides that catalyze the carbon nanotubes synthesis reaction. The growth of the clinker specific surface produces a higher integration between clinker phases and carbon nanotubes and probably also generating nitrogen defect sites in cement grains and nanotube walls, which are desirable for a better integration of such elements to cement.

4—Method for Preparing Oxide Supports and Their Posterior Addition to Cement Clinker The said method allows using one of the clinker components, namely CaO, MgO or $SiO_2$, or their combination, which if enriched with transition metals by one of the methods described above become active for the production of carbon nanotubes through chemical vapor-phase deposition. By this method, one or some oxide clinker components is/are activated for carbon nanotubes growth, which now becomes/become a component or components for addition after clinker calcination or an additive or additives for making other ceramic or polymeric composites.

After this enrichment phase of cement clinker containing transition metals, this material is put into a rotary kiln of controlled and reducing atmosphere together with injection of a light hydrocarbon, such as natural gas, methane, ethylene, propane, acetylene, nonlimiting though, the use of natural gas being preferable however. An inert gas is used as carrier agent, namely nitrogen, argon, helium, being nitrogen preferable however. Such gaseous light hydrocarbons undergo a pyrolysis reaction at high temperatures and controlled atmosphere environment. The said pyrolysis reaction is catalyzed by the presence of transition metal nanoparticles described herein locally producing free carbon and $C_x$—$H_y$ species responsible for carbon nanotubes growth. Anchoring these nanoparticles in high stability compounds at high temperatures (high thermal stability oxide supports, such as $Al_2O_3$, $SiO_2$, CaO, MgO or phases resulting from their combination) is an important measure for preventing the emergence of microprecipitates and agglomeration of such transition metal nanoparticles in a condition of carbon nanotubes synthesis by chemical vapor-phase deposition.

The flow of gases depends on the size of the kiln in which pyrolysis reaction occurs, whose carbon precursor/inert gas ratio ranges from 10-3 to 10-1 mol/mol. The temperature of the kiln where pyrolysis occur should be held constant ranging from 600° C. to 1400° C. preferably at 800° C. and total pressure, near or higher than the atmosphere pressure. The said kiln should have controlled atmosphere, preventing entry of oxygen from the external environment. The said kiln should be tubular-shaped, whose central part is rotary so as to allow the clinker powder to rotate, as well as a continuous exposure of the solid-gas interface, in this way producing a homogeneous growth of carbon nanotubes onto the cement clinker powder. The residence time of the cement clinker powder in the high temperature region of the kiln is controlled, the inclination of which should be variable. The kiln rotary movement and inclination produce a continuous renewal and exposure of the particulate matter to the reducing atmosphere, besides allowing a continuous translational movement within the hot zone. Therefore, it is possible to integrate this new rotary tubular kiln in the conventional cement industry for producing the said cement/carbon nanotubes composite in a continuous and large-scale manner.

Adding the said rotary kiln with controlled atmosphere to the oxidative calcination rotary kiln would be enough for a continuous large-scale in situ synthesis of carbon nanotubes onto clinker phases. Additionally, the hot gases produced in the cement clinker calcination kiln can be used for heating the said rotary kiln, which only requires to be adapted to an external chamber.

The flowchart seen in FIG. 12 shows the modified traditional Portland cement manufacturing process to which new systems and equipment were added for producing the aforesaid carbon nanotubes cement composite.

This new process can be applied to the traditional cement industry. In case the production of said composite is not integrated to the traditional cement industry, such process should follow two different phases.

The first phase would or not involve a combination of cement powder or cement clinker to precursor transition metal compounds in a weight proportion varying between 1% to 10% with its calcination in oxidizing atmosphere at temperatures ranging from 300° C. to 600° C., preferably at 400° C., for 30 to 200 minutes, preferably for 60 minutes.

The second phase would involve a controlled introduction of such particle material into a rotary kiln of controlled atmosphere, with temperatures varying from 600° C. to 1,100° C., preferably at 800° C., into which an inert carrier gas is injected, such as nitrogen, argon or helium, preferably nitrogen, and a carbon precursor gas, such as nonrestrictive natural gas, methane, ethylene, acetylene or propane, preferably natural gas. The total influx of the inert gas-carbon precursor gas combination is dependent on the physical dimensions of the synthesis system, which varies from 1,000 sccm to $10^4$ slm, the ratio precursor gas/inert gas being $10^{-4}$ a 10 mol/mol. The said rotary kiln of controlled atmosphere is to be inclined from a horizontal line, in this way making it possible a continuous flow of such particulate in the high temperature region. The particulate residence time in the high temperature region is controlled by its sliding speed, which is determined by the said kiln rotation and inclination. Another alternative for the passage of this particulate by the high temperature region can be the resort to using an Archimedes' screw concentric to the controlled atmosphere tubular kiln. In this case, the particulate residence time in the high temperature region is controlled by the angular pace and speed of the screw in relation to its axis. In this case, the tubular kiln may be horizontal with no rotation movement in relation to its axis. The mixture and particulate shifting are then determined by the rotation speed of the Archimedes' screw within the fixed horizontal tubular kiln.

The aforesaid process of continuous large-scale synthesis of cement/carbon nanotubes composite allows controlling changes due to the said two basic components that enable controlled variations in the composite's physico-chemical features, which in turn allow a significant improvement of its applicability range for both structural and artistic reinforcement ends. The concentration of carbon nanotubes in relation, to clinker in the high temperature region may be controlled by the flow control, relative composition of involved gases and residence time of clinker in the high temperature region in said synthesis process. In such circumstances, it is possible to enrich cement clinker with carbon nanotubes in concentrations varying between 0.01% and 30%.

FIG. 11 represents a simplified scheme of a continuous large-scale production system of cement-carbon nanotubes composite:
1—rotary tubular kiln of controlled atmosphere and variable or not inclination;
2—entry silo for cement enriched with transition metals;
3—entry for process gases—inert gas and precursor carbon gas;
4—gas outlet;
5—silo for collecting material after synthesis;
6—regulating valve for material outlet after synthesis;
7—conveyor line for the material after synthesis;
8—heating system for the rotary kiln for an optional use of hot gases coming from the oxidative calcination kiln for cement clinker;
9—entry regulating valve for the material.

Below, some nonlimiting examples of carbon nanotubes synthesis using cement clinker as catalytic support.

Examples of Carbon Nanotubes Synthesis Using Cement Clinker as Catalytic Support

EXAMPLE 1

Carbon nanotubes synthesis onto cement clinker and liquid impregnation of catalyzing metals.

This example of direct synthesis of carbon nanotubes onto cement clinker involves the preparation of cement clinker as catalytic support of transition metals as a first stage, and then the growth of carbon nanotubes by chemical vapor-phase deposition as a second stage.
First of all, ferro-nitrate was mixed with anhydride isopropanol by mechanical shaking until they were totally dissolved. The resulting solution was then added to cement clinker so as to obtain a 10% weight enrichment of Fe in relation to said cement clinker. In this example, 30 g of cement clinker was mixed with 100 ml of an isopropanol solution containing 10 g of $Fe(NO_3)_3 \cdot 9H_2O$, which thus produced a way for cement clinker impregnation with a weight proportion of 4.5% of Fe in relation to said cement clinker. The resulting material was then put into a kiln at 100° C. for 6 h for isopropanol evaporation followed by 400° C. calcination in muffle kiln for 1 hour. Therefore, cement clinker with nanoparticles of $Fe_2O_3$ precipitates was obtained onto clinker phases, which was then converted into the catalytic support for said carbon nanotubes synthesis. This material was then led to chemical vapor-phase deposition and treated under argon atmosphere of a 1,000 sccm flow for 8 minutes and heated at a temperature of 800° C. After reaching 800° C., 20 sccm of ethylene was added to argon flow for 30 minutes. Following this phase of carbon nanotubes growth, the precursor gas was removed and inert gas maintained, and the system was left to rest for 90 minutes. After cooling, the clinker powder became dark-colored indicating the presence of carbon. This material was then observed by scanning electron microscopy whose images are shown in figures below, which indicate a significant presence of carbon nanotubes. FIGS. 2 and 3 show images taken from the scanning electron microscopy with a large amount of spread carbon nanotubes on cement clinker.

EXAMPLE 2

8 g of Portland cement clinker with no transition metal compounds or ionic salts were carried to a chemical vapor-phase deposition system in an oxygen atmosphere at a temperature of 800° C. for 1 hour for a treatment of calcination and elimination of volatile species. After calcination, the said material was submitted to an inert argon atmosphere at 1,000 sccm and 800° C. temperature for 30 minutes. Then, an ethylene flow of 20 sccm was added as a carbon precursor at a temperature of 800° C. for 30 minutes.

Afterwards, ethylene was removed and argon maintained at 1,000 sccm during a cooling phase for 90 minutes. After cooling, a sample was removed from the system for characterizing its efficiency as for carbon nanotube production, using the iron content present in clinker as a catalytic agent for such production.

EXAMPLE 3

300 g of cement powder was mixed with 30 g of $Fe_2O_3$ and 30 g of urea. The mixture was put into a ball mill for 24 hours and then calcined at 400° C. for 1 hour. After calcination, 100 g of the said mixture were spread over a SiC plate and submitted to an argon flow of 1,000 sccm for 30 minutes under an inert atmosphere at 800° C. Following this, under an argon flow rate of 1,000 sccm, ethylene was added at 20 sccm flow rate for 1 hour. Then, ethylene was removed and the said sample was left to cool to environment temperature under argon at a flow rate of 1,000 sccm. This sample then showed a black-colored surface, indicating the presence of carbon, being afterwards characterized by sweeping scanning electron microscopy and Raman spectroscopy, whose results can be found in the following figures: FIG. 4 is the scanning electron microscopy image and shows some carbon nanotubes coming out of cement particles, as well as regions with large amounts of interwoven carbon nanotubes. FIG. 5 is a Raman spectrum of the cement-carbon nanotubes composite sample, synthesized according to the previous example, showing a peak in the 1,580 $cm^{-1}$ region, a characteristic of multi-walled carbon nanotubes, and a feeble band in the 1,340 $cm^{-1}$ region, indicating the presence of a small amount of amorphous carbon.

EXAMPLE 4

300 g of cement powder was mixed with 30 g of $Fe_2O_3$ and 30 g of urea. The mix was put into ball mill for 24 hours and calcined at 400° C. for 2 hours. Following calcination, 100 g of the mixture was spread over a SiC plate and submitted to an argon flow of 1000 sccm for 30 minutes under an inert atmosphere at 800° C. Following this, under an argon flow rate of 1,000 sccm, ethylene was added under a flow rate of 100 sccm for 1 hour. Then, ethylene was removed and the said sample was left to cool to environment temperature under argon at a flow rate of 1,000 sccm. This sample then showed a whole black-colored volume indicating the presence of carbon. The said sample was then characterized by sweeping electronic microscopy and Raman spectroscopy and the results are shown in the following figures: FIG. 6 is an image of a sweeping electronic microscopy showing some carbon nanotubes coming out of cement particles in regions containing a large amount of woven carbon nanotubes; FIG. 7 is a Raman spectrum of the cement-carbon nanotubes composite sample synthesized according to the example previous described showing a peak in the 1,580 cm$^{-1}$ region, a characteristic of multi-walled carbon nanotubes, and a feeble band in the 1,340 cm$^{-1}$ region, indicating the presence of a small amount of amorphous carbon.

EXAMPLE 5

300 g of Portland cement was mixed with 9 g of $Fe_2O_3$, which produced a mixture weighing 2% of Fe in relation to cement. This mixture was put into a ball mill and mixed for 12 hours. The resulting material was then put into a tri-zone horizontal kiln where 100 g were heated at 800° C. under an argon flow rate of 1,000 sccm and then ethylene was added under 100 sccm. The aforesaid system was held at a temperature of 800° C. for 2 h under said conditions. In this phase, carbon nanotubes were grown onto said mixture by chemical vapor-phase deposition. After deposition, ethylene was removed and argon held at 1,000 sccm up to the system was cooled to environment temperature. The color of the sample then taken from the kiln was dramatically changed into black indicating carbon deposition. Such synthesis product was then characterized by scanning electron microscopy, Raman spectroscopy and thermogravimetric analysis and results are shown in the following figures: FIG. 8 is a sweeping electronic microscopy image showing a sample region after synthesis where a large amount of spread carbon nanotubes with a low concentration of impurities can be seen.

FIG. 9 is a scanning electron microscopy image showing another sample region after synthesis where carbon nanotubes with an average length of 80 μm can be seen binding cement grains and forming a cement grain network.

EXAMPLE 6

300 g of magnesium phyllosilicate $Mg_6(Si_3O_{20})(OH)_4$, known as talcum stone, were mixed with 15 g of $Fe_2O_3$ producing a combination weighing 3% of Fe in relation to MgO, which was put into a ball mill and mixed for 24 h. The resulting material was then put into a horizontal kiln where 10 g of said material was heated at 600° C. under oxidizing atmosphere for 1 h. After calcination, 3 g of this mixture was heated at 900° C. in a controlled atmosphere tubular kiln under an argon flow rate of 1,000 sccm and ethylene was added under a flow rate of 20 sccm for 0.5 h. Then, ethylene was removed and the sample, cooled to environment temperature under argon at 1,000 sccm.

EXAMPLE 7

100 g of Portland cement were mixed with 3 g of iron ore with 78% hematite content producing a mixture 2% weight of Fe in relation to cement, which was put into a ball mill and mixed for 12 h. The resulting material was then put into a tri-zone horizontal kiln where 100 g of which was heated at 800° C. under an argon flow rate of 1,000 sccm and then ethylene was added at 100 sccm. The system was held at 800° C. for 2 h under such conditions. In this phase, carbon nanotubes were grown onto the mixture by chemical vapor-phase deposition. After deposition, ethylene was removed and argon held at 1,000 sccm up to the system was cooled at environment temperature.

The whole surface of the final sample was black-colored while its bottom was dark grey indicating the presence of carbon. The said sample was then characterized by scanning electron microscopy whose results are shown in the following figures. FIG. 10 is an image of two different and representative regions of the sample microstructure of the cement-carbon nanotube composite, synthesized under the conditions described in the example above, showing some carbon nanotubes coming out of cement particles in regions containing large amounts of carbon nanotubes.

The examples described above show that cement clinker enriched or not with transition metals is a good support for carbon nanotubes growth by chemical vapor-phase deposition. In all said examples cement clinker enriched with transition metals makes it possible to produce large-scale continuous synthesis of carbon nanotubes onto cement clinker particulates, some processes of which are more efficient than others. As for the results shown herein, the process described in example 3 is preferential in relation to the remaining ones, as it produces well-spread carbon nanotubes on clinker particulates in a highly efficient way, as compared to the remaining processes, besides requiring a simple preparation.

Additionally, example 7 shows the possibility of producing a low-cost nanocomposite as adding iron ore makes transition metal cement clinker richer, providing catalytic activity for carbon nanotube synthesis.

The aforesaid examples demonstrate the possibility of using cement clinker for carbon nanotubes synthesis and for producing nonlimiting nanostructured cement clinker/carbon nanotube composites. Furthermore, changes in this synthesis process by adding new components, such as nonlimiting surfactants, dispersants, cure retarders, are also objects of the present invention.

Figure 2:
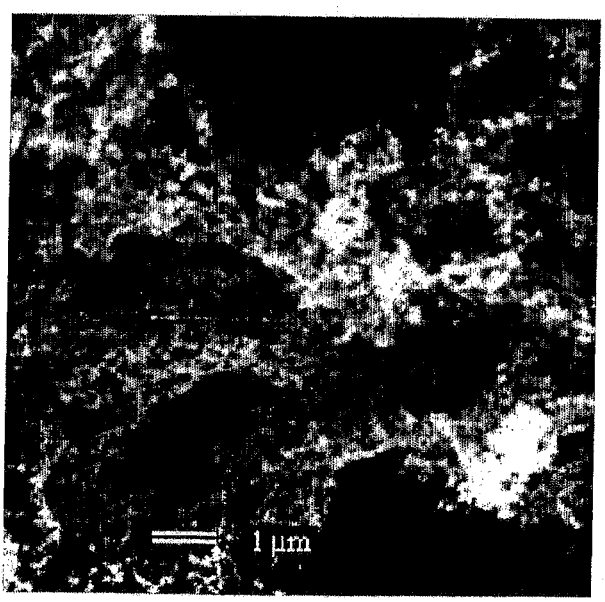

1—$C_2H_4$
2—Flow Controller
3—Quartz Tube
4—Kiln
5—Exhaustion
6—Nanotubes
7—Fe—Mo
8—MgO FIG. 2—Image of scanning electron microscopy showing a large amount of spread carbon nanotubes on cement clinker. Microscopy of a sample of carbon nanotubes synthesis carried out using the process described in example 1 above.

Figure 1:
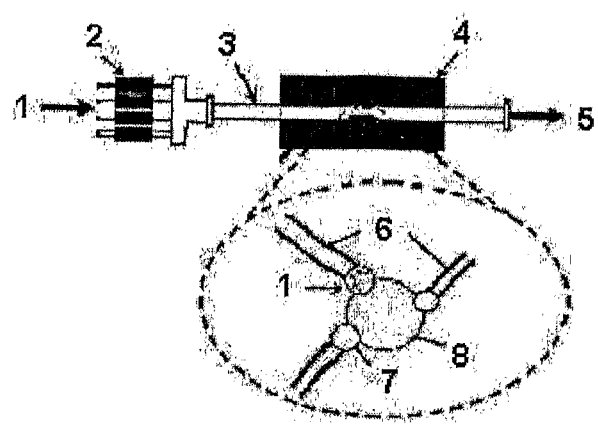
FIG. 1—A schematic drawing of a chemical vapor-phase deposition using carbon nanotubes catalytic synthesis onto oxide particles as those described above, as well as a microscopic view of the growth of carbon nanotubes by using the said technique.
Figure 3:
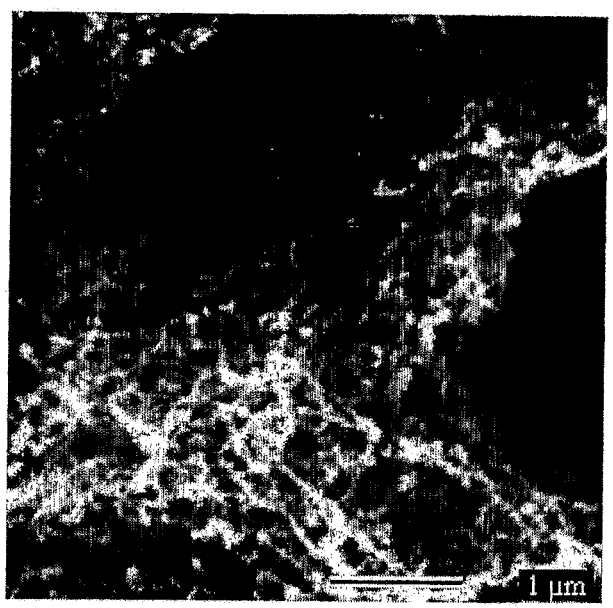

FIG. 3—Image of scanning electron microscopy showing spread carbon nanotubes on cement clinker support, besides another region of the same sample in FIG. 1.

Figure 4:
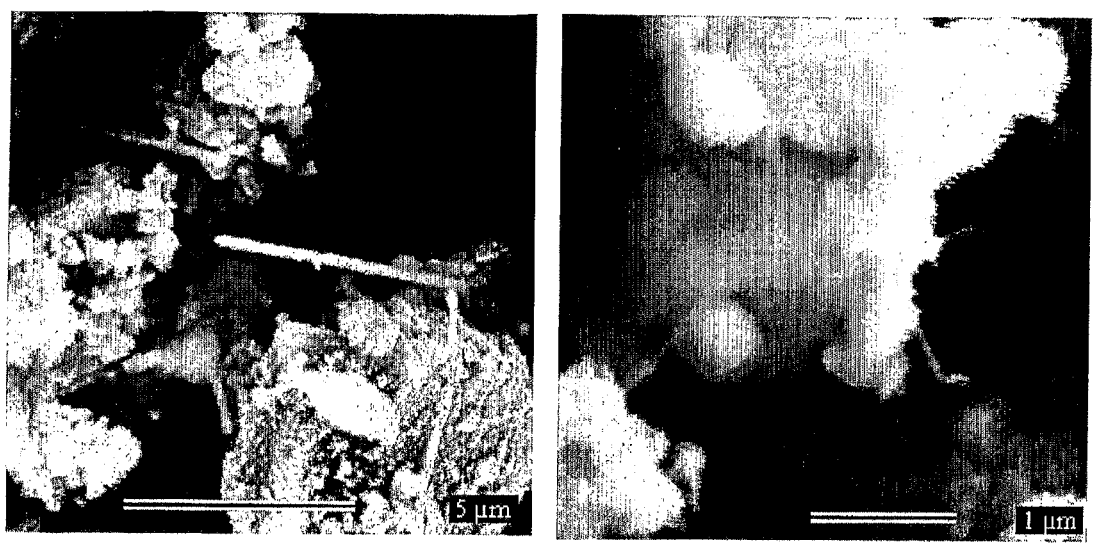

FIG. 4—A scanning electron microscopy of two distinct representative regions of the microstructure of cement-carbon nanotubes composite that were synthesized under the conditions described in example 3 above, showing some carbon nanotubes coming out of cement particles, as well as regions containing large amounts of woven carbon nanotubes.

Figure 5:
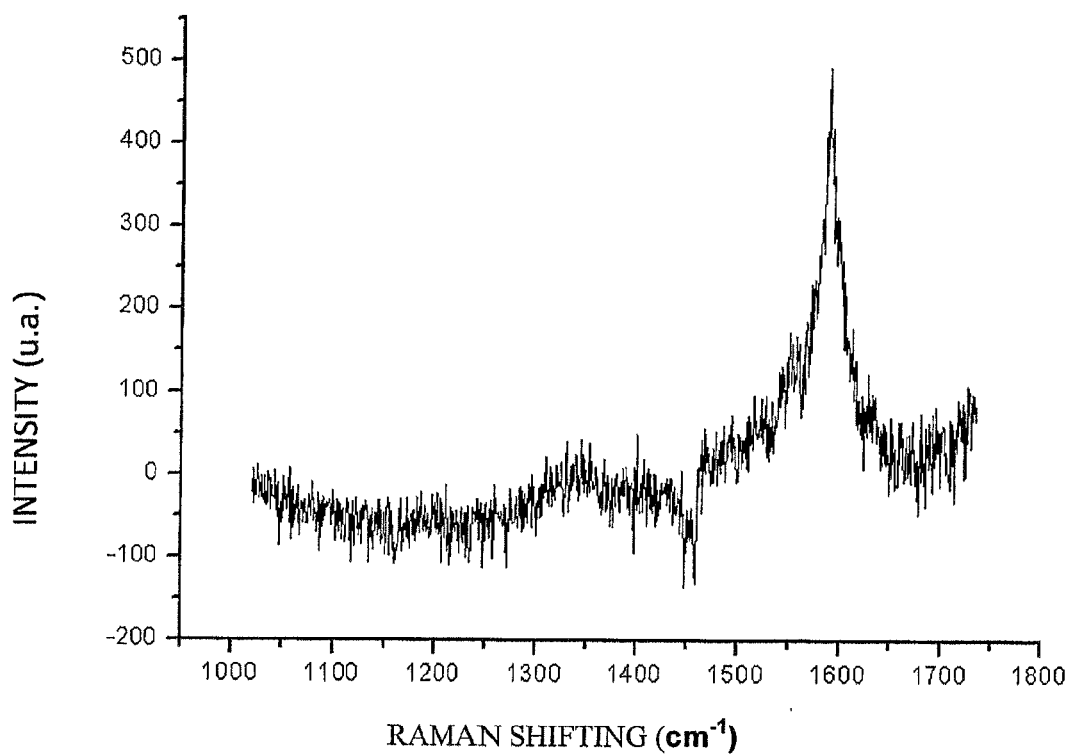

FIG. 5—Raman spectrum of a sample of carbon nanotubes composite, synthesized under the conditions described in example 3 above, showing a peak in region 1,580 cm$^{-1}$, which is characteristic of multi-walled carbon nanotubes, as well as a feeble band in region 1,340 cm$^{-1}$, indicating the presence of a small amount of amorphous carbon.

Figure 6:
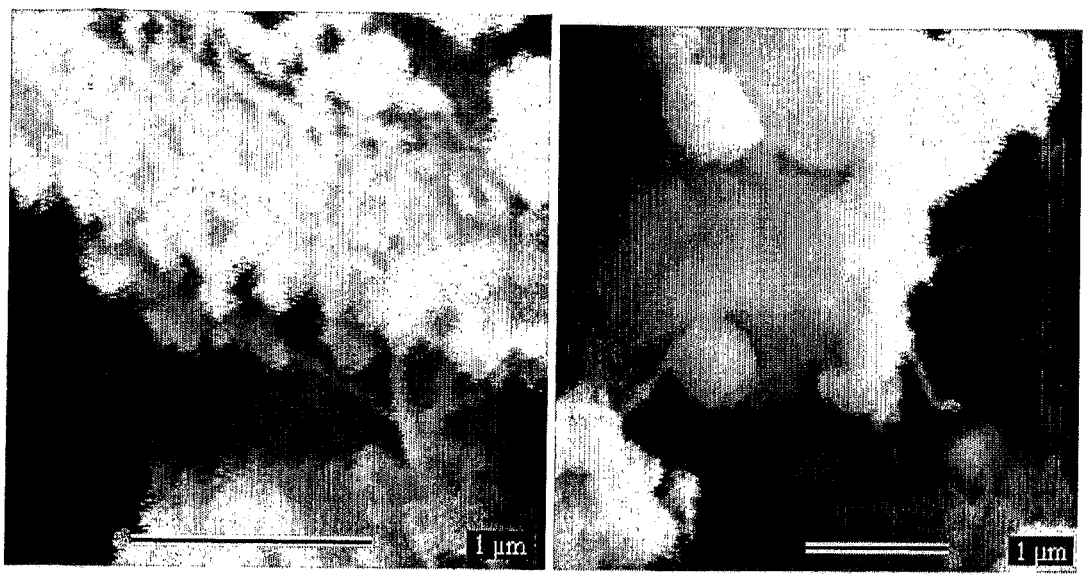

FIG. 6—A scanning electron microscopy of two distinct representative regions of the microstructure of cement-carbon nanotubes composite that were synthesized under the conditions described in example 4 above, showing some carbon nanotubes coming out of cement particles, as well as regions containing large amounts of woven carbon nanotubes.

Figure 7:
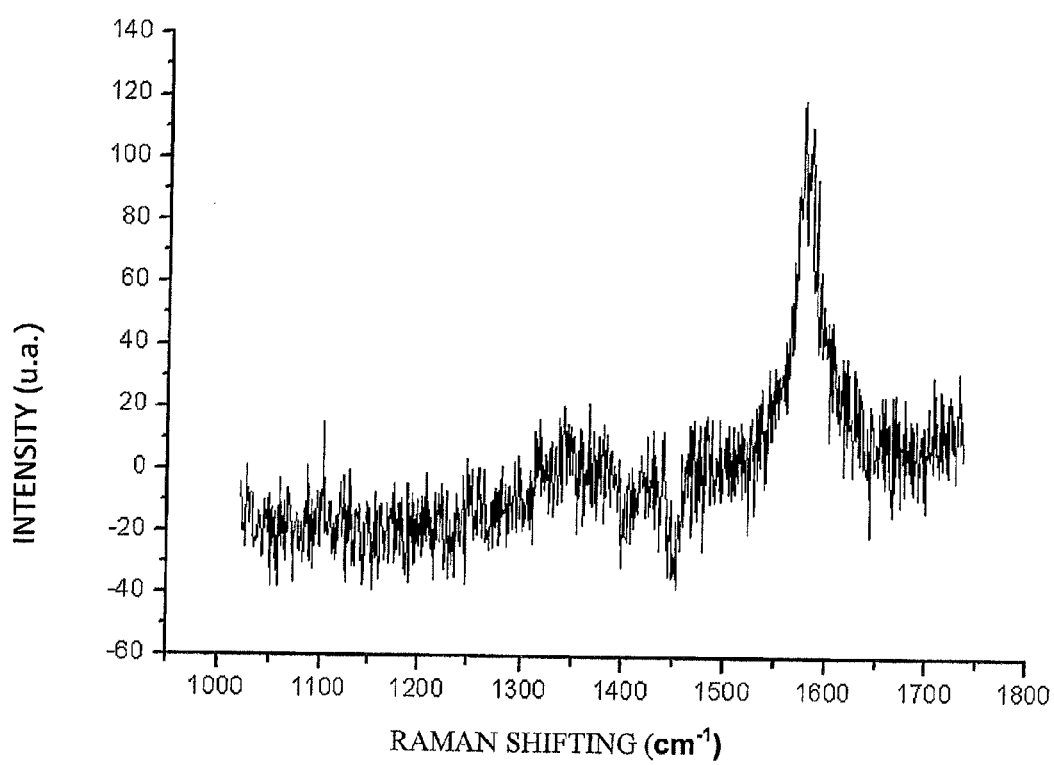

FIG. 7—Raman spectrum of a sample of carbon nanotubes composite synthesized under the conditions described in example 4, showing a peak in region 1,580 $cm^{-1}$, which is characteristic of multi-walled carbon nanotubes, as well as a feeble band in region 1,340 $cm^{-1}$, indicating the presence of a small amount of amorphous carbon.

Figure 8:
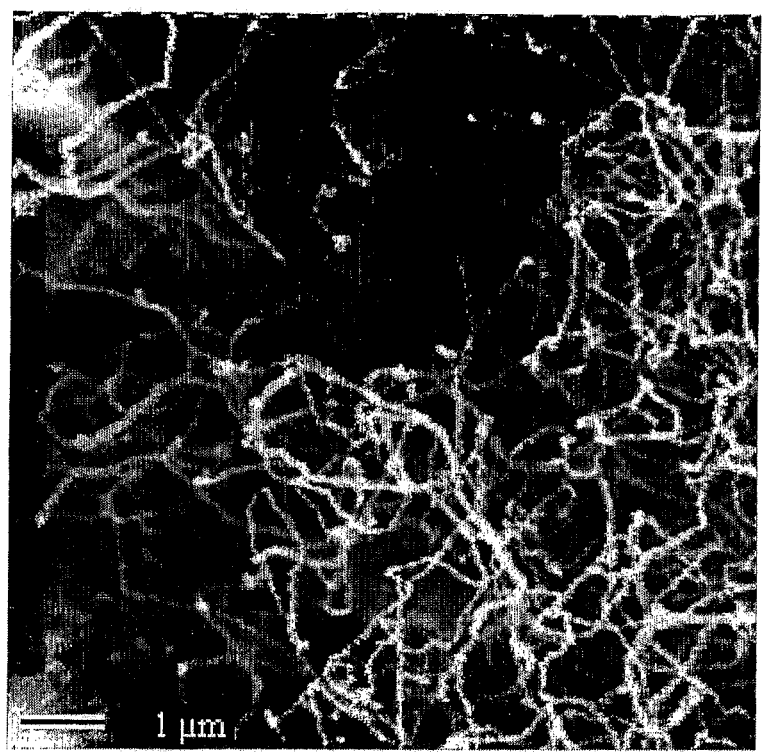

FIG. 8—A scanning electron microscopy showing a sample region in example 5 after synthesis in which a large amount of spread carbon nanotubes with low concentration of impurities can be seen.

Figure 9:
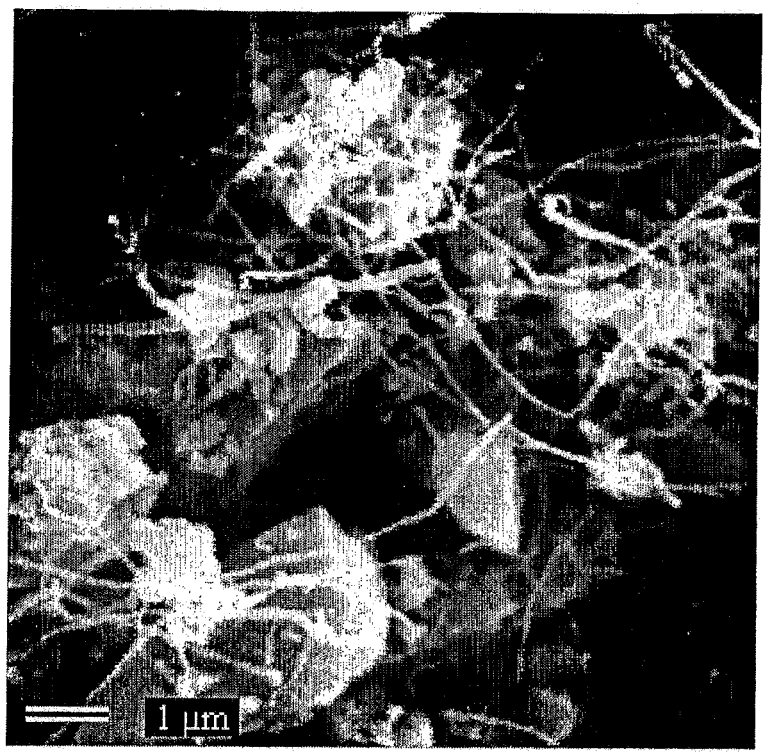

FIG. 9—A scanning electron microscopy showing another region of example 5 after synthesis in which medium-length carbon nanotubes (80 μm) connecting cement grains and producing an interconnection network among cement grains can be seen.

Figure 10:
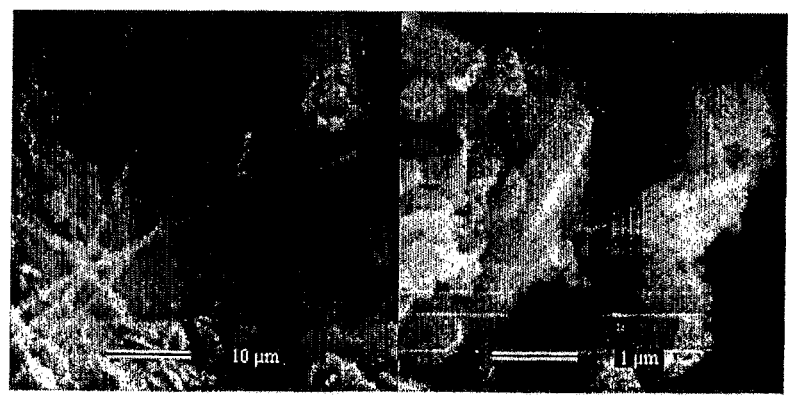

FIG. 10—A scanning electron microscopy of two distinct representative regions of the microstructure of cement-carbon nanotubes composite that were synthesized under the conditions described in example 7 above, showing some carbon nanotubes coming out of cement particles, as well as regions containing large amounts of carbon nanotubes.

Figure 11:
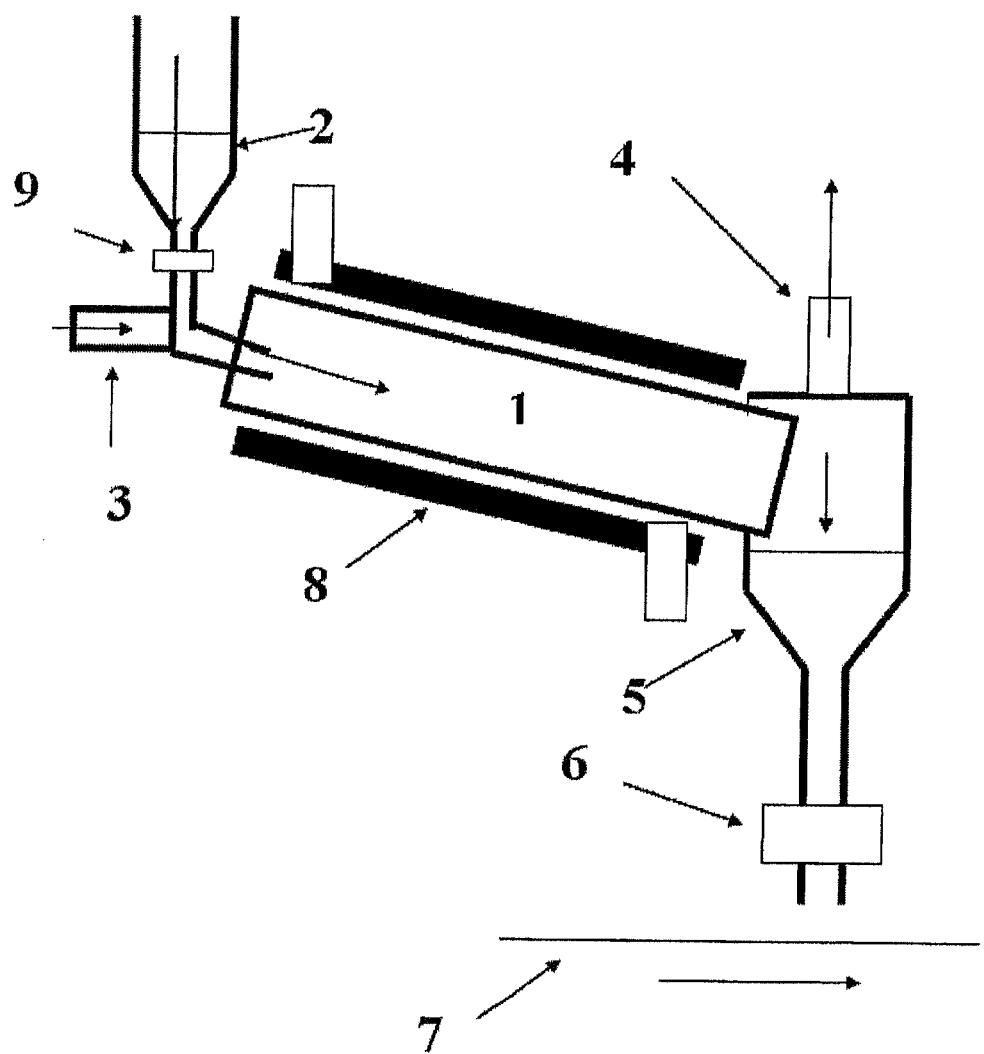

FIG. 11—A schematic drawing of the large-scale continuous production system of cement-carbon nanotubes composite:
1—rotary tubular kiln of controlled atmosphere and with or without variable inclination;
2—entry silo for cement enriched with transition metals;
3—entry for gases in the process—inert gas and carbon precursor gas;
4—gas outlet;
5—silo for collecting material after synthesis;
6—regulating valve for material outlet after synthesis;
7—conveyor line for material after synthesis;
8—heating system of rotary kiln, using or not heated gases from oxidizing calcination of cement clinker;
9—regulating valve for material entry.

Figure 12:
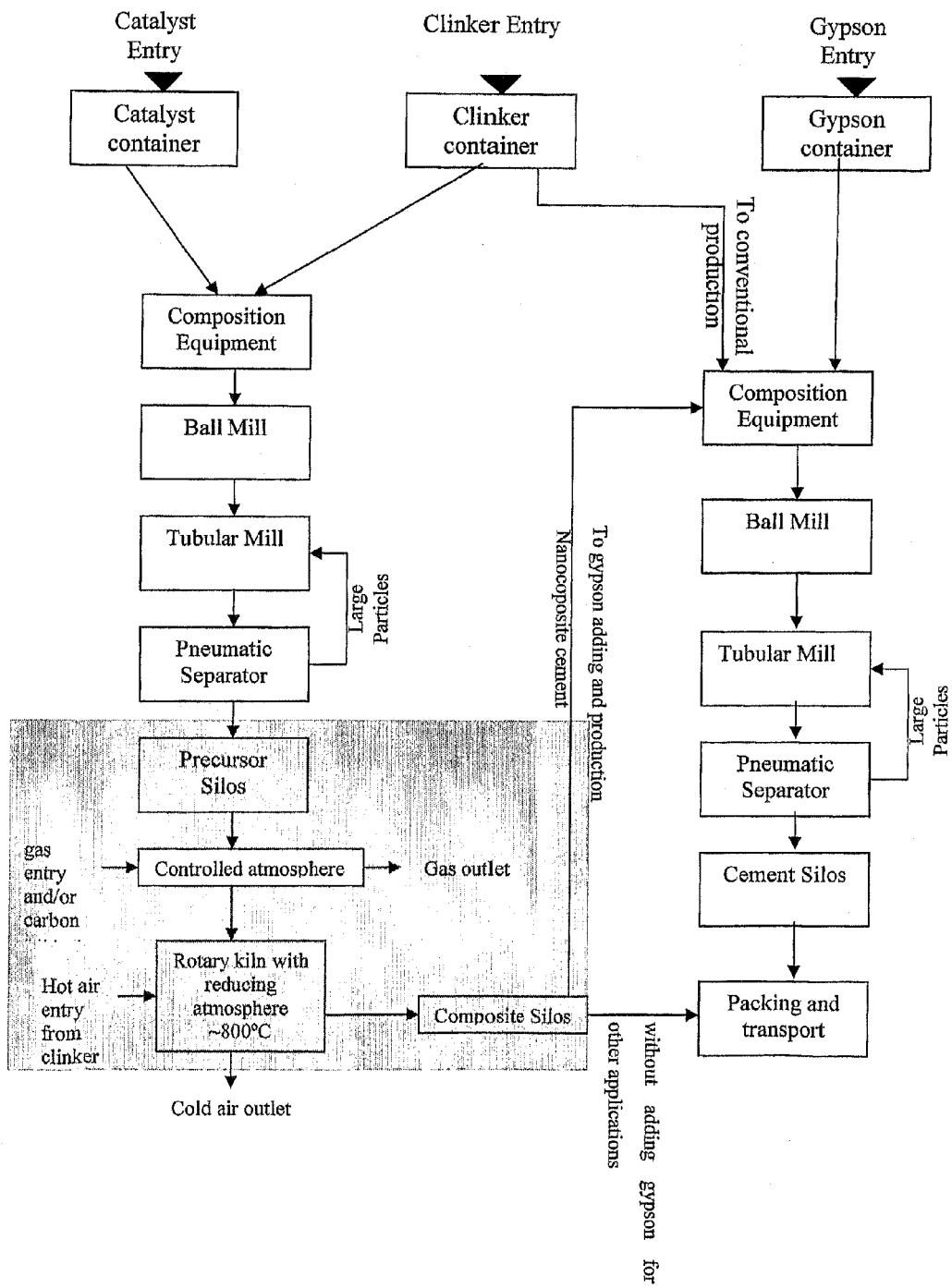

FIG. 12—Flowchart illustrating the traditional Portland cement production and its changes by using new systems and equipment needed for producing the said cement-carbon nanotubes composite integrated to the traditional cement production.

The invention claimed is:

1. A process for synthesis of carbon nanotubes, comprising a cement clinker as catalytic support for growing carbon nanotubes by anchoring transition metals, which comprises the following stages:
(i) method for enriching cement clinker in solid phase and/or liquid phase with transition metal oxides and/or salts both containing transition metal cations; and
(ii) introducing enriched clinker into a kiln of controlled and reducing atmosphere with injection of light hydrocarbons and addition of inert gas as carrier at high temperatures effective for provoking a pyrolysis reaction and thus the growth of carbon nanotubes by chemical vapor-phase deposition.

2. The process according to stage (i) of claim 1, which occurs in solid phase through physical mixture of metals or oxides or organometallic compounds of transition metals with phases resulting from the calcination of cement clinker precursors $C_3S$ (3CaO—$SiO_2$) and $C_2S$ (2CaO—$SiO_2$), calcium aluminates $C_3A$ (3CaO—$Al_2O_3$), calcium ferro-aluminate $C_4AF$ (4 CaO—$Al_2O_3$—$Fe_2O_3$), oxide supports of alkaline metals or alkaline earth metals, alkaline silicates or alkaline earth metal silicates, aluminum-silicates, alkaline earth metal oxides, transition metals or semi-metals, $Al_2O_3$, $SiO_2$, CaO, MgO, or phases resulting from combinations of the compounds.

3. The process according to claim 1, wherein transition metal oxides or compounds or their combination are incorporated in solid phase, when preparing clay and limestone mixture or after their calcination.

4. The process according to stage (i) of claim 1, wherein the method of enriching clinker in its liquid phase comprises addition of transition metal ions to cement clinker through the following stages:
(I) dissolving transition metal compounds as solute in a solvent to provide a solution mixture;
(II) adding the solution mixture containing dopant metals to cement clinker until a homogeneous mixture is reached, including a posterior drying stage for evaporation of the solvent; and
(III) calcination of the homogeneous mixture at temperature from 200° C. to 800° C.

5. The process according to claim 1, wherein transition metal concentration is from 0.1% to 10% in relation to cement clinker.

6. The process according to claim 1, comprising an anion selected from the group consisting of sulphates, nitrates, oxalates, citrates, phosphates, acetates, and transition metal organometallic compounds.

7. The process according to claim 1, wherein the cement clinker as catalytic support for growing carbon nanotubes is without transition metal precursors.

8. The process according to stage (ii) of claim 1, wherein a carbon precursor source as the light hydrocarbons is selected from the group consisting of methane, ethylene, propane, acetylene, carbon monoxide, and natural gas.

9. The process according to stage (ii) of claim 1, wherein the inert gas as carrier is selected from the group consisting of nitrogen, argon, and helium.

10. The process according to stage (ii) of claim 1, wherein the homogeneous growth of carbon nanotubes onto cement clinker powder occur in a kiln optionally tubular, inclined and rotary (rotating central section).

11. The process according to claim 10, wherein the cement clinker permanence within the kiln is controlled by its variable inclination.

12. The process according to stage (ii) of claim 1, wherein temperature is from 600° C. to 1,400° C.

13. The process according to stage (ii) of claim 1, wherein total pressure is about or above atmospheric pressure.

14. The process according to stage (ii) of claim 1, wherein there is a controlled atmosphere so as to prevent entering of environmental oxygen.

15. The process according to claim 1, comprising an in situ synthesis catalytic reaction of carbon nanotubes onto cement clinker phases.

16. The process according to stage (i) of claim 1, wherein the transition metal cations are selected from the group consisting of Ti, Cr, Mn, Cu, Mo, W, Al, Ta, Rh, Pt, Pd, Au, Ir, Ru, Nb, Zr, Fe, Co and Ni.

17. The process according to stage (I) of claim 4, wherein the solvent is selected from the group consisting of anhydride and volatile polar organic liquids.

18. A process for synthesis of carbon nanotubes, wherein a cement clinker is used as a catalyst support for growing carbon nanotubes by anchoring transition metals, the process comprising:
- (i) enriching the cement clinker in solid phase and/or liquid phase with transition metal oxides and/or salts both containing transition metal cations, and
- (ii) introducing enriched cement clinker into a kiln of controlled and reducing atmosphere with injection of light hydrocarbons and addition of inert gas as carrier at high temperatures effective to promote pyrolysis and to grow carbon nanotubes on the cement clinker by chemical vapor-phase deposition.

19. The process according to claim 18, wherein (i) enriching the cement clinker in liquid phase comprises addition of transition metal ions to the cement clinker through the following:
- (I) dissolving transition metal compounds as solute in a solvent to provide a solution mixture;
- (II) adding the solution mixture containing dopant metals to the cement clinker until a homogeneous mixture is reached, including a posterior drying stage for evaporation of the solvent; and
- (III) calcination of the homogeneous mixture at temperature from 200° C. to 800° C.

20. A process for forming carbon nanotubes/cement clinker composite by adding from 0.05% to 1% of carbon nanotubes onto cement clinker, wherein the cement clinker is used as a catalyst support for growing the carbon nanotubes by anchoring transition metals, the process comprising:
- (a) enriching and activating basic cement clinker in solid phase and/or liquid phase with transition metal oxides and/or salts both containing transition metal cations by
  - (I) dissolving transition metal compounds as solute in a solvent to provide a solution mixture,
  - (II) adding the solution mixture containing dopant metals to the cement clinker until a homogeneous mixture is reached, including a posterior drying stage for evaporation of the solvent, and
  - (III) calcination of the homogeneous mixture at temperature from 200° C. to 800° C.; and
- (b) introducing enriched cement clinker into a kiln of controlled and reducing atmosphere with injection of light hydrocarbons and addition of inert gas as carrier at high temperatures effective to promote pyrolysis and to grow carbon nanotubes on the cement clinker by chemical vapor-phase deposition.

* * * * *